United States Patent [19]

Jang

[11] Patent Number: 5,361,094
[45] Date of Patent: Nov. 1, 1994

[54] CCD-TYPE COLOR VIDEO CAMERA WITH GAMMA CORRECTION

[75] Inventor: Ji-hoon Jang, Bucheon, Rep. of Korea

[73] Assignee: Samsung Electronics Co., Ltd., Kyungki, Rep. of Korea

[21] Appl. No.: 120,534

[22] Filed: Sep. 14, 1993

[30] Foreign Application Priority Data

Sep. 14, 1992 [KR] Rep. of Korea .................. 92-16671

[51] Int. Cl.⁵ .................. H04N 5/202; H04N 9/69
[52] U.S. Cl. ................................... 348/254; 348/674
[58] Field of Search ................ 358/32, 37, 39, 40, 358/43, 44, 164, 27, 167, 168, 169, 36; 348/254, 674; H04N 9/69, 5/202, 5/20

[56] References Cited

U.S. PATENT DOCUMENTS 5,068,718 11/1991 Iwabe et al. ..................... 358/39
5,253,046 10/1993 Shiraishi ......................... 358/43

Primary Examiner—Mark R. Powell
Assistant Examiner—Cheryl Cohen
Attorney, Agent, or Firm—Robert A. Westerlund; Stephen R. Whitt; Charles R. Donohoe

[57] ABSTRACT

A video signal processing circuit of a CCD-type color video camera includes a gamma-correcting circuit section, a delay circuit section, a chrominance signal processor and a luminance signal processor. Accordingly, the circuit is configured such that gamma-compensation processing is performed before the separation of the luminance and chrominance signals, and a DC fluctuation due to the gamma-compensation processing is compensated in the luminance signal processor. Thus, horizontal noise caused by the gamma correction can be eliminated, which not only improves picture quality but also enables a reduction in chip size.

6 Claims, 4 Drawing Sheets

CCD-TYPE COLOR VIDEO CAMERA WITH GAMMA CORRECTION

BACKGROUND OF THE INVENTION

The present invention relates to a charge-coupled device (CCD) type color video camera, and more particularly to a video signal processor for a single-plate color filter array (CFA) CCD type color video camera.

In a general CCD type color video camera as shown in FIG. 1, a video signal processor is provided for converting a CCD output signal into a television signal having a luminance signal and color difference signals and output the television signal. A conventional video signal processor comprises a delay circuit 10 which receives a CCD output, signal and outputs a 1H line delay signal and a 2H line delay signal ("H" representing one period of the horizontal synchronizing signal), a luminance signal processor 12 which receives the CCD output signal and the 1H and 2H line delay signals and outputs a luminance signal (Y), and a chrominance signal processor 14 which also receives the CCD output signal and the 1H and 2H line delay signals to output a color difference signal (C).

Luminance signal processor 12 comprises vertical aperture processor 12a which receives the CCD output signal and the 1H and 2H line delay signals and performs vertical aperture processing, a horizontal aperture processor 12b which receives only the 1H line delay signal and performs horizontal aperture processing, an adder 12c which adds the output signals of the vertical and horizontal aperture means and the 1H-delayed CCD output signal, and a first gamma ($\gamma$) correction circuit 12d which gamma-corrects the output signal of the adder and outputs a final luminance signal.

Chrominance signal processor 14 comprises an RGB matrix circuit 14a for receiving the CCD output signal and the 1H and 2H line delay signals and outputting R, G and B color signals, second, third and fourth gamma correcting circuits 14b, 14c and 14d for performing gamma correction with respect to the RGB color signal from RGB matrix circuit 14a, and an encoder 14e for receiving the three gamma-corrected primary colors (R, G and B) so as to output the color difference signals R−Y and B−Y as part of the composite video signal for a color television. A single plate CFA-CCD may obtain the color separation and the high-resolution luminance signal according to the color arrangement characteristic of the color filter array by generating CCD output signals, so as to repeatedly apply S1 (R+G+2B) and S2 (R+2G) to the 1H line and S1 (2G+B) and S2 (2R+G+B) to the 2H line, respectively. Accordingly, even when a subject producing two equal luminance signals is to be displayed, since the RGB composition ratios of S1 and S2 are different from each other, the difference between the signal levels of S1 and S2 occurs. For example, if the colors of the displayed object are blue, the 1H line has S1 (2B) and S2 (0) and the 2H line has S1 and S2 (both equaling B) so that DC levels are equal at both lines, but the 1H line is repeatedly provided with 2B and 0 so that the 2H line is repeatedly provided with the values B and B, i.e., DC components. Therefore, the conventional circuit composition shown in FIG. 1 would be affected by a horizontal noise component which is generated on the screen due to a fluctuation in the DC level after gamma compensation, which degrades picture quality. That is, as shown in FIG. 2, gamma compensation circuit 12d exhibits a non-linear gamma-compensating characteristic curve, so that the 2H line has S1 and S2 (both equaling B) thereby the B-input DC level is gamma-compensated into the output DC level at position "a," and "b" is the gamma characteristic of the input value 2B. However, the 1H line has S1 (2B) and S2 (0), thus the repeatedly input DC level is shown as 0 and 2B respectively, so that the output DC level at position "c" as an average of "0" and "b" is obtained regardless of gamma compensation. Therefore, upon the completion of the gamma compensation, the DC levels of the 1H and 2H lines differ by as much as the value of "d."

In addition, in the conventional method of circuit configuration, the luminance and chrominance signals are separated and then the gamma compensation processing is individually performed with respect to each signal, so that four gamma compensation circuits (12d, 14b, 14c and 14d) become necessary. Accordingly, each gamma compensating circuit having non-linear characteristics should be embodied as a ROM look-up table, which consumes four such tables. Therefore, a significant amount of chip area is occupied in the form of IC processing, which has been a major obstacle in the reduction of chip size.

SUMMARY OF THE INVENTION

An object of the present invention is to provide a video signal processor for improving the picture quality of the single plate CFA-CCD type video camera, for overcoming the above-described conventional problems.

Another object of the present invention is to provide a video signal processor for decreasing chip size when manufacturing an integrated circuit.

For accomplishing the above-mentioned objects, the present invention provides a video signal processing circuit for a single charge-coupled device (CCD) color video camera, the circuit receiving a CCD output signal and outputting television luminance and chrominance signals, and the CCD output signal having two different chrominance signals S1 and S2 alternately arranged, wherein the S1 is R+G+2B and the S2 is R+2G at an odd line and the S1 is 2G+B and the S2 is 2R+G+B at an even line, the circuit comprising:

gamma correction means for receiving the CCD output signal and outputting a gamma-corrected signal;

delay means for receiving the gamma-corrected signal and outputting 1H- and 2H-line-delayed signals;

a chrominance signal processor for receiving the gamma-corrected signal and the 1H- and 2H-line-delayed signals and outputting the television chrominance signal and a DC-fluctuation detection signal obtained by the gamma correction and generated as a difference signal between S2 and S1 of the gamma-corrected signal; and a luminance signal processor for receiving the gamma-corrected signal and the 1H- and 2H-line-delayed signals, and outputting the television luminance signal which is compensated for DC fluctuation due to the gamma-correction in response to the DC-fluctuation detection signal.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

A preferred embodiment of the present invention will be described in more detail below, with reference to the accompanying drawings.

Figure 1:
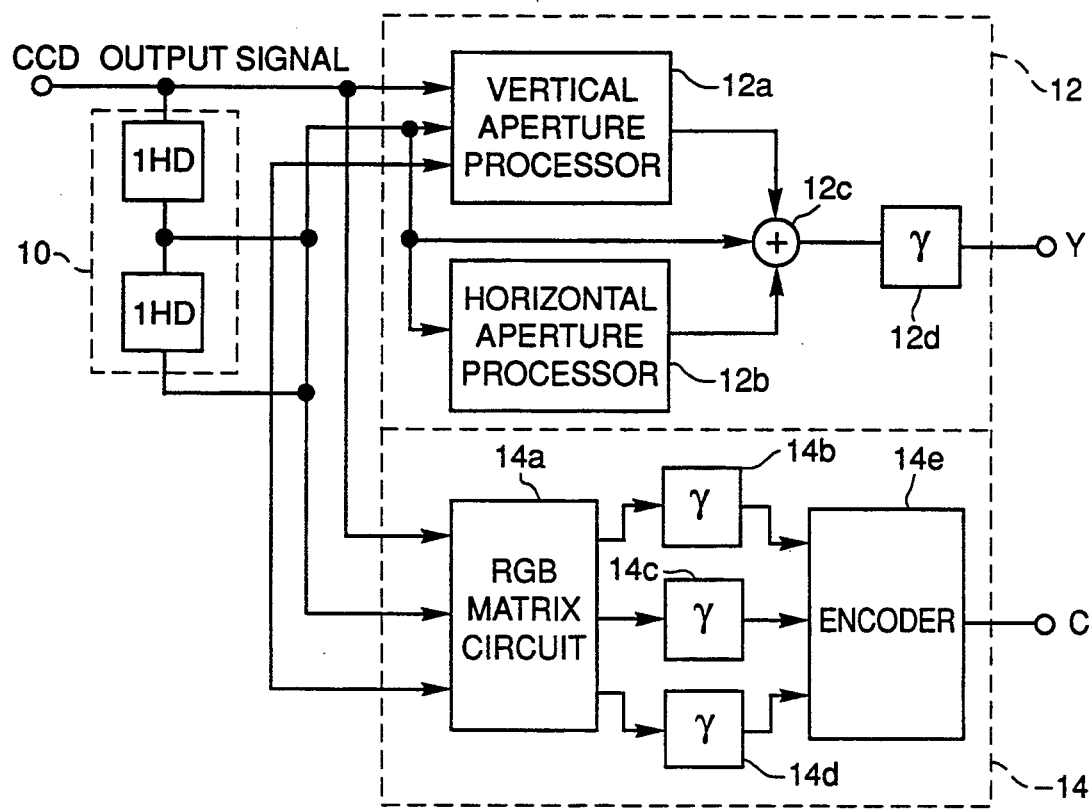
FIG. 1 is a block diagram showing a video signal processing circuit of the conventional single plate CFA-CCD type color video camera.
Figure 2:
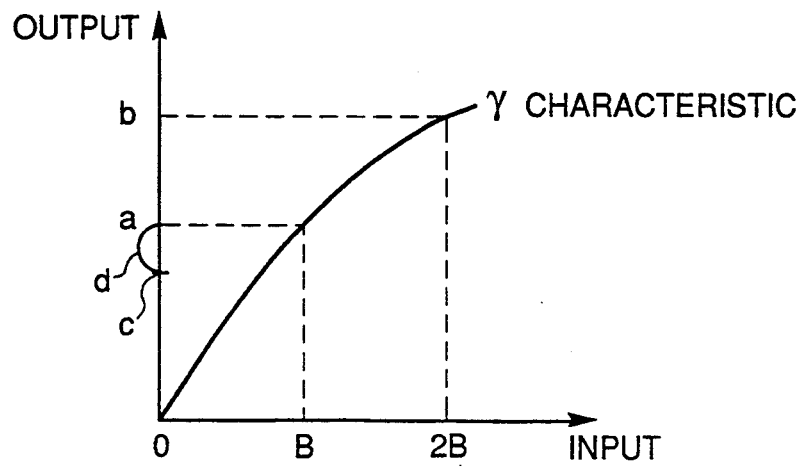
FIG.2 illustrates the DC fluctuation caused by a general gamma compensating circuit.
Figure 3:
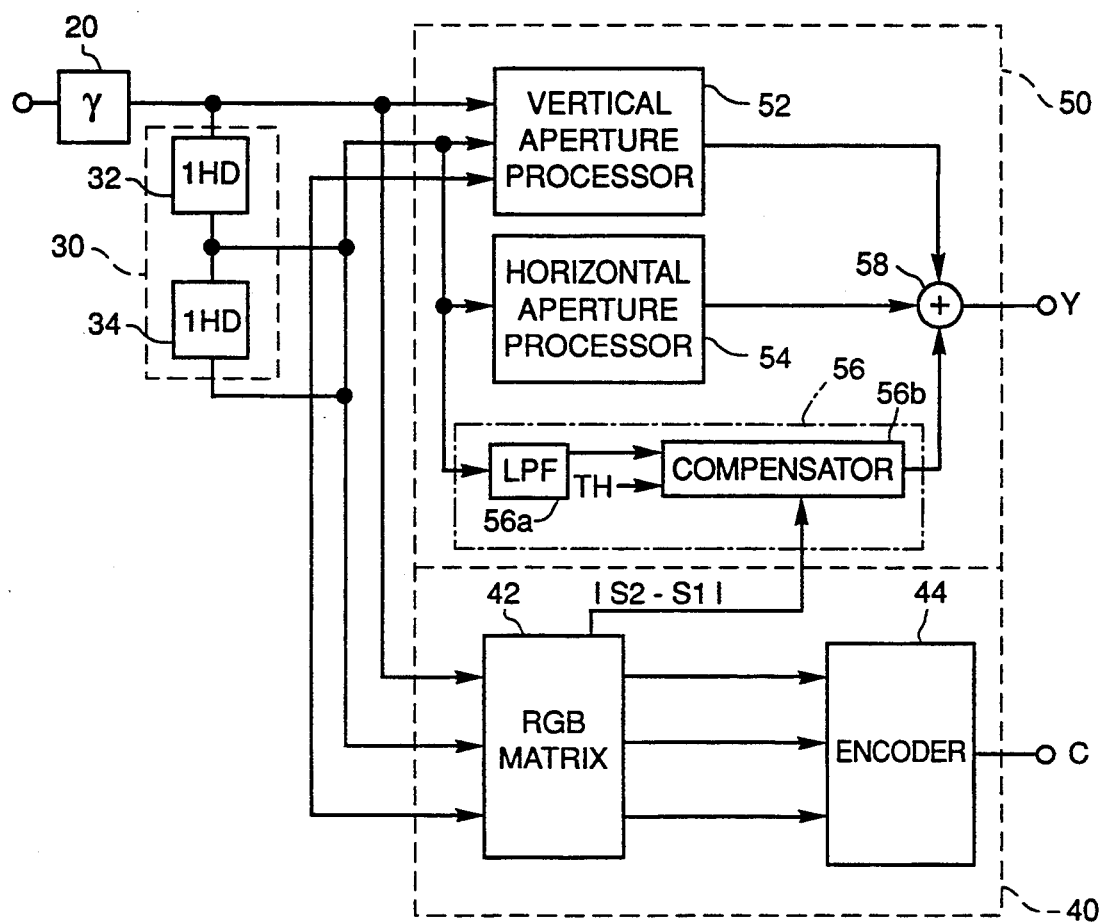
FIG.3 is a block diagram showing a video signal processing circuit of a CCD-type color video camera according to the present invention.

FIG.3 shows a block diagram of the video signal processing circuit of the CCD type color video camera according to the present invention. A gamma-correction circuit 20 receives the CCD output signal as an input, and outputs the gamma-corrected signal. Delay circuit 30 consists of a serial connection of a pair of 1H line delay means 32 and 34, and outputs the gamma-corrected signal as a 1H line delay signal and 2H line delay signal. A chrominance signal processor 40 comprising RGB matrix circuit 42 and encoder 44 receives the gamma-corrected signal and the 1H and 2H line delay signals, and thereby outputs a color difference signal, and simultaneously generates a detection signal according to the DC fluctuation caused by the gamma correction via RGB matrix circuit 42. A luminance signal processor 50 comprising a vertical aperture processor 52, a horizontal aperture processor 54, a DC-level compensator 56 and an adder 58, receives the gamma-corrected signal and the 1H and 2H line delay signals, to thereby output a luminance signal.

Figure 4:
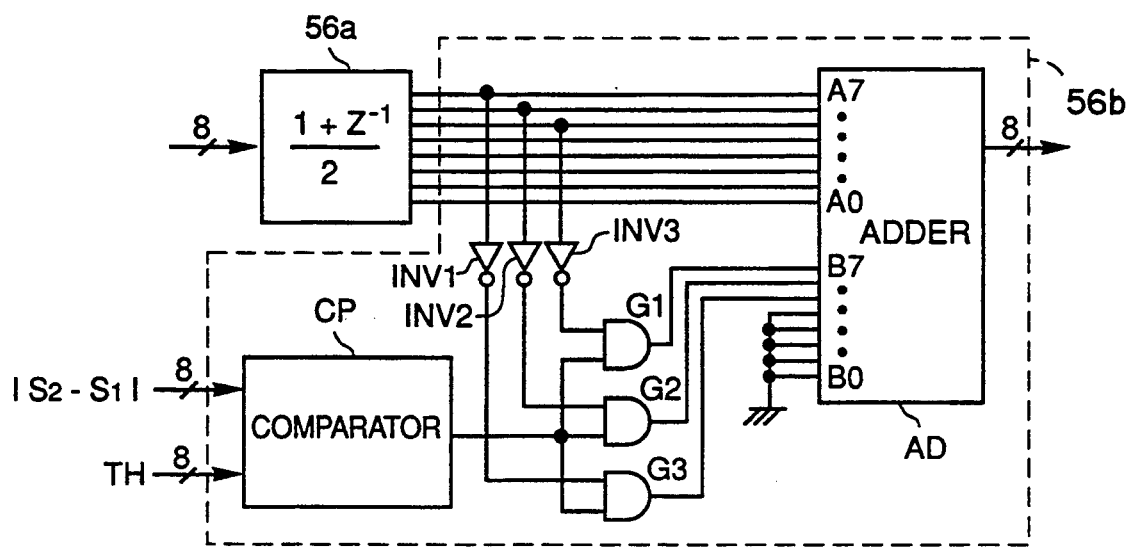
FIG.4 is a circuit diagram showing an embodiment of the DC-level compensating means of FIG. 3.
Figure 5:
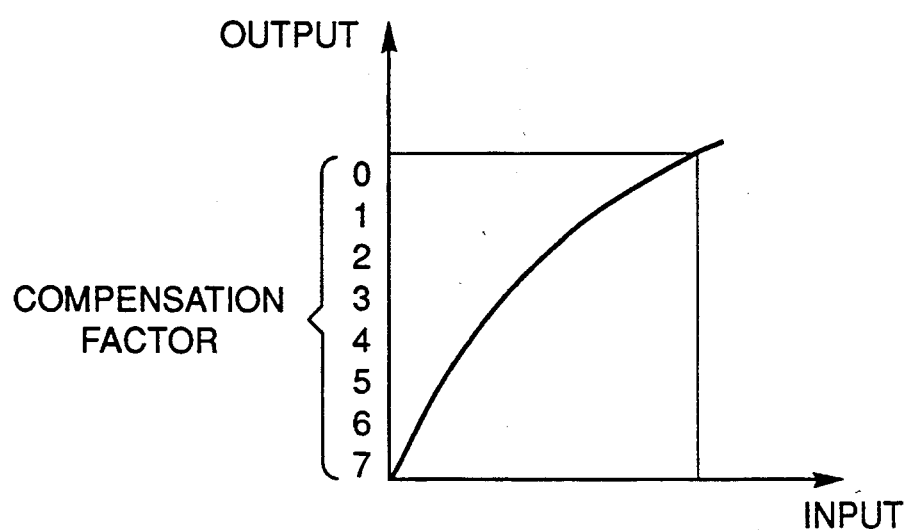
FIG.5 illustrates the compensation step of the DC-level compensating means of FIG.4.

The DC-level compensating means 56 of luminance signal processor 50 has a low-pass filter 56a and a compensator 56b, as shown in FIG.4. Low-pass filter 56a has a transfer characteristic defined as $$H(z) = \frac{1 + z^{-1}}{2}$$

where H represents the transfer function and z represents a variable of the z-transform, so as to perform low-pass filtering with respect to the 1H line delay signal.

A compensator 56b, in response to the detected signal |S2−S1| supplied from matrix circuit 42 of chrominance signal processor 40, outputs the low-pass-filtered signal intact when the detected signal is below a predetermined critical signal value, and otherwise the DC level of the low-pass-filtered signal is compensated so as to be output. In other words, compensator 56b comprises an 8-bit comparator CP for comparing the 8-bit detection signal |S2−S1| with the preset 8-bit threshold signal TH; inverters INV1, INV2 and INV3 for inverting the three most significant bits of the low-pass filtered signal: AND gates G1, G2 and G3 for gating the output signals of inverters INV1–INV3 by responding to the output of comparator CP: and an 8-bit adder AD for adding the low-pass filtered signal to the output of AND gates G1–G3. The preset threshold signal TH is necessary for passing the signal of which level of detection signal |S2−S1| is not greater as to affect the DC level and the image, performing the compensation for the part of which the difference of S2 and S1 is no longer small.

The DC-level compensation value is determined by dividing the level of the luminance into eight levels so that the compensation may be given to the parts having lower DC levels, since the derivative (i.e., the slope of the gamma characteristic curve of FIG .5) changes according to the luminance signal level with respect to the input and output of compensator 56b. This compensation is for preventing the DC fluctuation of the luminance signal and thus avoiding appearance of the horizontal line noise on the screen, since the gamma compensation circuit having a non-linear characteristic is positioned before the luminance and chrominance signal separation.

Figure 6:
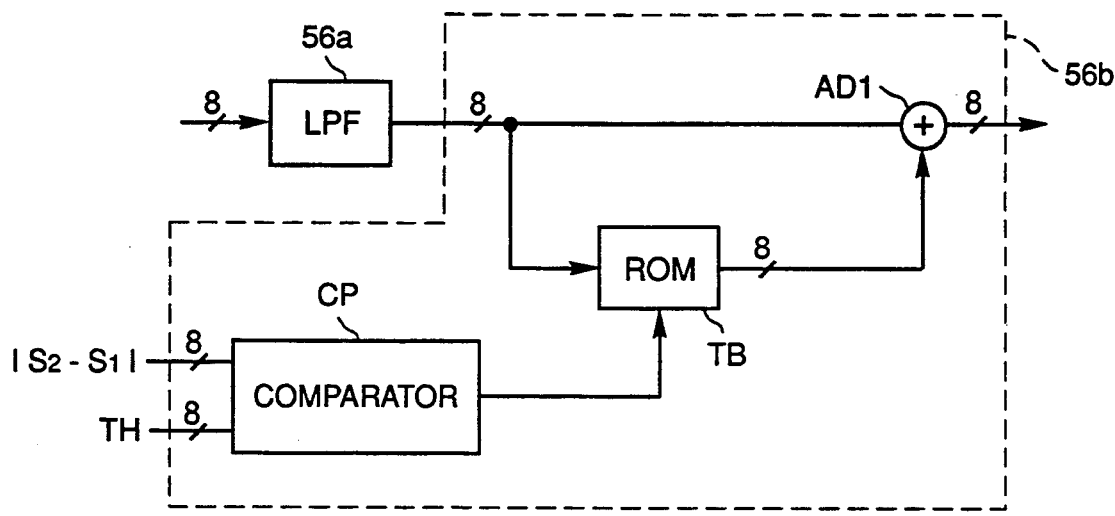
FIG.6 is a circuit diagram of another embodiment of the compensator of FIG. 3.

FIG.6 is a circuit diagram showing another embodiment of compensator 56b. In this embodiment, a read-only-memory is used for the look-up table TB and is chip-selected (enabled) in response to the output of comparator CP, so that an 8-bit compensating signal is read out according to an 8-bit address signal which is low-pass-filtered. This 8-bit compensating signal is then supplied to adder AD.

Figure 7:
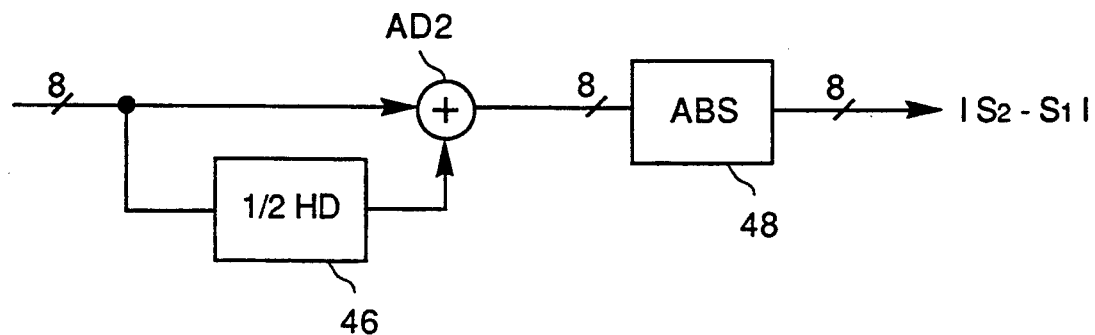
FIG.7 is a detailed circuit diagram of the DC-fluctuation detection signal generator in the RGB matrix circuit of FIG.3.

FIG.7 is a detailed circuit diagram showing the |S2−S1| detection signal generator in RGB matrix circuit 42 of FIG.3. The detection signal generator receives the gamma-corrected signal as to obtain a ½H-delayed signal from a one-half horizontal line delay 46, adds the delayed signal to the gamma-corrected signal at adder AD2, and then provides the resulting signal to an absolute value detection circuit 48 so as to obtain an absolute value signal |S2−S1|.

As discussed, the present invention provides a CCD-type video camera which is configured so as to perform gamma-compensation processing before luminance and chrominance signal separation, and compensate for a DC fluctuation caused by the gamma-compensation processing at the luminance signal processor, which can eliminate a horizontal noise component due to the gamma compensation, so that picture quality can be enhanced and chip size can be minimized when manufacturing integrated circuitry.

What is claimed is:

1. A video signal processing circuit for a single charge-coupled device (CCD) color video camera, said circuit receiving a CCD output signal and outputting television luminance and chrominance signals, and said CCD output signal having two different chrominance signals S1 and S2 alternately arranged, wherein said S1 is R+G+2B and said S2 is R+2G at an odd line and said S1 is 2G+B and said S2 is 2R+G+B at an even line, said circuit comprising:

gamma correction means for receiving said CCD output signal and outputting a gamma-corrected signal:

delay means for receiving said gamma-corrected signal and outputting 1H- and 2H-line-delayed signals:

a chrominance signal processor for receiving said gamma-corrected signal and said 1H- and 2H-linedelayed signals and outputting said television chrominance signal and a DC-fluctuation detection signal obtained by said gamma correction means and generated as a difference signal between S2 and S1 of said gamma-corrected signal: and a luminance signal processor for receiving said gamma-corrected signal and said 1H- and 2H-line-delayed signals, and outputting said television luminance signal which is compensated for DC fluctuation due to said gamma-correction in response to said DC-fluctuation detection signal.

2. A video signal processing circuit of a single-plate color filter array (CFA) CCD type color video camera as claimed in claim 1, wherein said luminance signal processor comprises:

vertical aperture means for receiving said gamma-corrected signal and said 1H and 2H line delay signals and outputting a vertically apertured signal;

horizontal aperture means for receiving said 1H line delay signal and outputting a horizontally apertured signal:

DC-level compensating means for receiving said 1H line delay signal and then responding with said DC-fluctuation detection signal so as to output a DC-level-compensated signal; and an adder for adding the output signals from said vertical aperture means, said horizontal aperture means and said DC-level compensating means, and thereby outputting said luminance signal.

3. A video signal processing circuit of a single-plate CFA CCD type color video camera as claimed in claim 2, wherein said DC-level compensating means comprises:

a low-pass filter for low-pass-filtering said 1H line delayed signal; and a compensator for receiving said low-pass-filter signal and a predetermined critical value signal, and if said DC-fluctuation detection signal is greater than said predetermined critical value signal, performing a DC-level compensation and outputting said DC-level-compensated signal, and otherwise outputting the signal intact.

4. A video signal processing circuit of a single-plate CFA CCD type color video camera as claimed in claim 3, wherein the transfer characteristic of said low-pass filter is defined $$H(z) = \frac{1 + z^{-1}}{2}$$

where H represents the transfer function and z represents a variable of the z-transform.

5. A video signal processing circuit of a single-plate CFA CCD type color video camera as claimed in claim 3, wherein said compensator comprises:

inverters for respectively inverting the three most significant bits of said low-pass-filtered signal:

a comparator for comparing said predetermined critical value signal with said DC-fluctuation detection signal;

gates for respectively gating the output signals of said inverters in response to the output signal from said comparator: and an adder for adding the outputs of said gates to said low-pass-filtered signal, so as to output said DC-level-compensated signal.

6. A video signal processing circuit of the CFA CCD type color video camera as claimed in claim 3, wherein said compensator comprises:

a comparator for comparing said predetermined critical value signal with said DC-fluctuation detection signal;

look-up table means for, in response to the output signal of said comparator, being enabled and addressed according to said low-pass-filtered signal, and thereby generating a compensation signal; and an adder for summing said compensation signal and said low-pass-filtered signal, so as to output said DC-level-compensated signal.

* * * * *